June 17, 1969  B. PERKINS, JR  3,449,943

CENTERING MECHANISM

Filed May 11, 1966

INVENTOR,
Beauregard Perkins, Jr.

BY: Harry M. Saragovitz,
Edward J. Kelly &
A. J. Dupont    ATTORNEYS

United States Patent Office 3,449,943
Patented June 17, 1969

3,449,943
CENTERING MECHANISM
Beauregard Perkins, Jr., Ocala, Fla., assignor to the United States of America as represented by the Secretary of the Army
Filed May 11, 1966, Ser. No. 550,093
Int. Cl. G01v 1/16
U.S. Cl. 73—71
4 Claims

ABSTRACT OF THE DISCLOSURE

A centering mechanism consisting of a housing in which a pair of horizontally spaced, oppositely inclined tracks are mounted. A mass having spring mounted wheels that ride on the tracks cause the mass to return to a median position thereon after being displaced.

---

The invention described herein may be manufactured and used by or for the Government for governmental purposes, without the payment to me of any royalty thereon.

This invention relates to a centering mechanism for use with any recording instrument, such as the horizontal displacement meter disclosed in my earlier U.S. Patent No. 3,164,983, Jan. 12, 1965, for measuring absolute transient motion.

The displacement meter cited above, as well as most motion-sensitive devices for the notation and measurement of earthquakes, explosions and the like, are comprised of essentially a housing, a track mounted horizontally within the housing and an inertia or seismic mass adapted to move freely along the length of the track. Functionally, such devices rely upon the law of inertia to keep the mass at rest when outside forces cause the housing and track to move in a horizontal direction. Such action results in relative movement by the mass along the track mathematically proportionate to the distance traveled by the housing. Metering devices of this sort also incorporate mechanical or electronic recording means to transcribe or transmit the displacement of the mass.

As can be seen, one key to the success of the operation described above is the return of the mass to a median position on its track. Without such return the device is unable to function repeatedly, for eventually the mass will reach the end of the track and will be incapable therefore of measuring movement requiring it to move further in the same direction. Although various means have been proposed for accomplishing centering of the mass after movement, no really efficient method has heretofore been devised. Among those centering devices which have been utilized with moderate success are the two disclosed in the aforementioned patent.

It is an object of the present invention to provide an efcient means for centering the inertia weight of a motion-responsive device.

It is a further object to provide centering means of simple, yet durable, construction capable of operation over sustained periods of time.

These and other objects and advantages of the present invention will be fully apparent from the following description taken in connection with the annexed drawing, in which.

Figure 1:
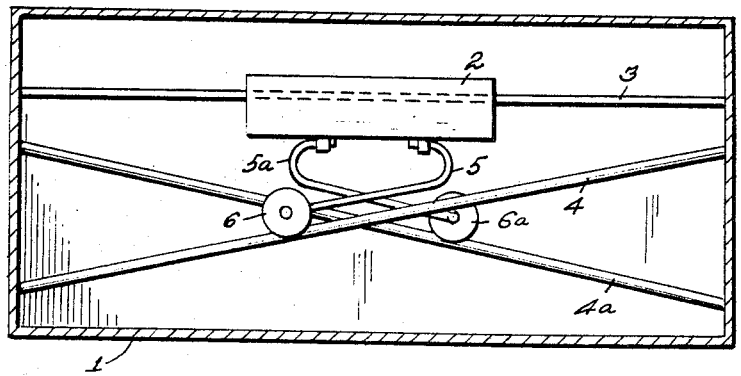
FIGURE 1 is a sectional view taken along line 1—1 of FIGURE 2.
Figure 2:
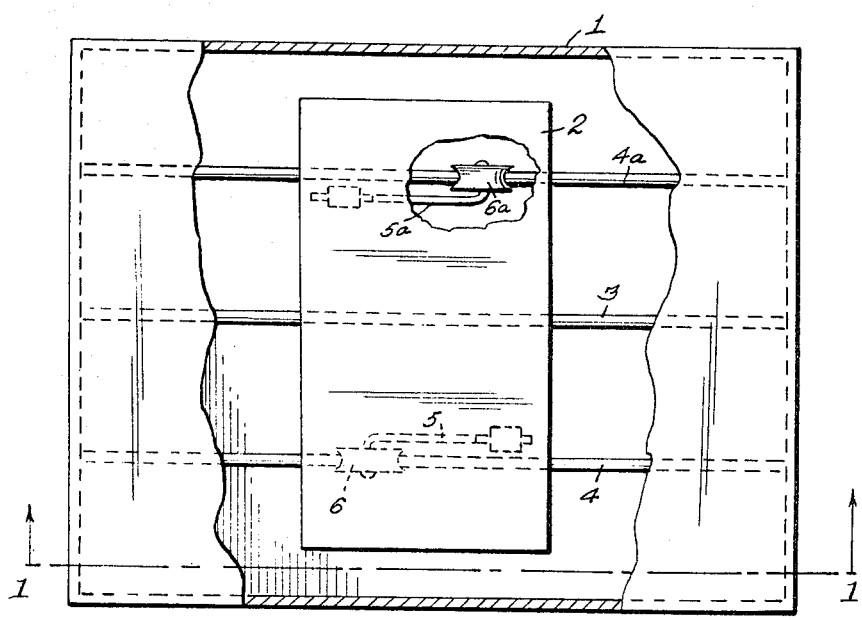
FIGURE 2 is a top view of the present invention with a portion of the cover removed.

The actual operation of the centering mechanism embodying the instant invention is set forth below. Movement is experienced by the housing 1 (which may correspond to the inner case of a displacement meter buried in the ground and utilized to measure earth tremors). Said movement must be in a horizontal direction to utilize the present invention. Upon horizontal displacement of the housing 1 due to earth tremors or shock or the like, the inertia or seismic mass 2, slidable on guide rod 3, tends to remain at rest. Because the mass 2 is in no way secured to the housing or any portion thereof, said tendency is for the most part realized. The mass 2 is, however, adapted to ride along the rod 3, which is secured at its ends to the housing 1. Hence, displacement of the housing 1 results in an identical displacement of rod 3, causing a relative movement of mass 2 along rod 3. At this point means should act to return the mass 2 to a median position on rod 3, restore it to rest and leave it in a position to respond to further movement.

Such "centering" means comprise the gravamen of the instant invention. Mass 2 is provided with small freely rotatable wheels 6, 6a connected to it by flat expansion springs 5, 5a. The wheels 6, 6a preferably are mounted equidistant from the center of gravity of mass 2 so as to provide stability as mass 2 travels along rod 3.

Also mounted on housing 1 are at least two tracks 4, 4a. Although the tracks may be curved, straight tracks of equal length were used in the present embodiment. Wheels 6, 6a are supported by the tracks which are oppositely inclined and horizontally spaced with the longitudinal axis of one track sharing a common vertical displacement with the longitudinal axis of the other track. Although it is possible to use tracks of different lengths mounted at different but equal angles with the horizontal, equal lengths and an inclination of 30° are suggested. If such tracks are mounted so that their lower ends are the same height from the bottom of housing 1, their medians will be en equal distance from the bottom of housing 1 and will correspond to a point equidistant from the longitudinal ends of housing 1. Thus the said medians of the tracks define the ideal location for the mass 2 to reside while at rest. At that point the wheels 6, 6a will occupy a position on their respective tracks 4, 4a which are equal distance from the bottom of mass 2 and are also equal distances from the bottom of housing 1. So long as the expansive forces in the speings 5, 5a are equal, the mass 2 will return to this central position following each movement relative to said rod 3.

Thus, the mechanism is designed to cause mass 2 to move along rod 3 to a central position. Springs 5, 5a mounted on the bottom of mass 2 press wheels 6, 6a respectively against tracks 4, 4a respectively. Such pressure of a wheel against an inclined track exerts a force with a horizontal component which tends to move the mass towards the lower end of the track. The inclination of the tracks in opposite directions causes a tendency for the spring action to move the mass in opposite directions. Only when the forces pressing the wheels against the tracks are equal, will the mass be in equilibrium. Said forces are equal when the mass is in the previously described central position.

While only preferred forms of the invention are shown and described, other forms of the invention are contemplated and numerous changes and modifications may be made therein without departing from the spirit of the invention as set forth in the appended claims.

What is claimed is:

1. In combination with a horizontal motion sensing device including a housing, a horizontally disposed rod carried by said housing and a mass adapted to move along said rod; a centering mechanism to return said mass to a given position on said rod comprising, paired expansion springs mounted on said mass equidistant from the center of gravity of said mass, a wheel carried by the free end of each said spring, and spaced tracks oppositely inclined relative to each other and to the horizontal carried by said housing, each said track supporting a said wheel on said springs and having a common vertical displacement horizontally aligned with said given position whereby when the mass is disposed between the ends of said housing the expansion force of the spring will cause said mass to assume said given position along said rod.

2. The centering mechanism set forth in claim 1 wherein the number of paired expansion springs is one and said oppositely inclined tracks are two in number and are so mounted that their common vertical displacement is median of said housing.

3. The centering mechanism set forth in claim 1 wherein each of said tracks is inclined at an angle of 30° with the horizontal.

4. The centering mechanism set forth in claim 1 wherein said oppositely inclined tracks are the same length.

References Cited

UNITED STATES PATENTS

| | | | |
|---|---|---|---|
| 3,164,983 | 1/1965 | Perkins | 73—71.2 |
| 3,243,772 | 3/1966 | Perkins | 73—71.2 |

RICHARD C. QUEISSER, *Primary Examiner.*

HERBERT GOLDSTEIN, *Assistant Examiner.*

U.S. Cl. X.R.

340—17